(12) United States Patent
Ignatenko et al.

(10) Patent No.: US 12,230,870 B2
(45) Date of Patent: Feb. 18, 2025

(54) ANNULAR RING ANTENNA WITH CONTIGUOUS RADIATING ELEMENTS FOR ENHANCING VEHICULAR COMMUNICATIONS AT MULTIPLE FREQUENCY BANDS

(71) Applicant: CUSTOM MICROWAVE INC., Longmont, CO (US)

(72) Inventors: Maxim Vladimirovich Ignatenko, Superior, CO (US); Philip Elwood Venezia, Longmont, CO (US); Sudhakar Krothapalli Rao, Rancho Palos Verdes, CA (US); Clency Lee-Yow, Niwot, CO (US); Richard Malcolm Dart, Arvada, CO (US)

( * ) Notice: Subject to any disclaimer, the term of this patent is extended or adjusted under 35 U.S.C. 154(b) by 0 days.

(21) Appl. No.: 18/610,069

(22) Filed: Mar. 19, 2024

(65) Prior Publication Data

US 2024/0266718 A1 Aug. 8, 2024

(51) Int. Cl.
| | |
|---|---|
| *H01Q 1/28* | (2006.01) |
| *H01Q 1/52* | (2006.01) |
| *H01Q 3/36* | (2006.01) |
| *H01Q 21/20* | (2006.01) |
| *H01Q 21/30* | (2006.01) |
| *H04B 7/06* | (2006.01) |

(52) U.S. Cl.
CPC ............ *H01Q 1/286* (2013.01); *H01Q 1/523* (2013.01); *H01Q 3/36* (2013.01); *H01Q 21/205* (2013.01); *H01Q 21/30* (2013.01); *H04B 7/0617* (2013.01)

(58) Field of Classification Search
CPC .......... H01Q 1/286; H01Q 1/523; H01Q 3/36; H01Q 21/30; H01Q 21/205; H04B 7/0617
See application file for complete search history.

(56) References Cited

U.S. PATENT DOCUMENTS

| 3,074,063 | A  | * | 1/1963 | Horton ............... | H01Q 21/0043 |
|---|---|---|---|---|---|
| | | | | | 343/708 |
| 6,388,610 | B1 | * | 5/2002 | Przyjemski .......... | H01Q 3/2605 |
| | | | | | 342/383 |
| 6,407,711 | B1 | * | 6/2002 | Bonebright .......... | H01Q 21/205 |
| | | | | | 343/705 |
| 6,856,290 | B1 | * | 2/2005 | Ryken .................. | H01Q 21/205 |
| | | | | | 343/846 |
| 2003/0043085 | A1 | * | 3/2003 | Park ...................... | H01Q 13/10 |
| | | | | | 343/895 |

(Continued)

*Primary Examiner* — Hai V Tran
(74) *Attorney, Agent, or Firm* — Novel Patent Services (57) ABSTRACT

A contiguous radiating ring antenna structure suitable for a vehicle is disclosed. The antenna structure comprises a curved shape structure having a plurality of radiating rings, a plurality of sectors, a connecting unit, and a plurality of frequency barriers. The antenna structure has a phase variation of less than 2° degrees over 360° of azimuth coverage and about +/−85° of elevation coverage. The antenna structure has a thickness of less than 0.5 inches. The contiguous radiating ring antenna structure is design for demanding vehicular applications, including missiles, rockets, and aircraft. The contiguous radiating annular ring antenna comprises a beam forming network, which is configured to be incorporated into a printed antenna board for enhancing the vehicular communications.

20 Claims, 9 Drawing Sheets

(56) References Cited

U.S. PATENT DOCUMENTS

2006/0250306 A1* 11/2006 Ryken .................... H01Q 1/286
                                                    343/705
2008/0007471 A1*  1/2008 Goldberg ............... H01Q 1/287
                                                    343/705

* cited by examiner

ANNULAR RING ANTENNA WITH CONTIGUOUS RADIATING ELEMENTS FOR ENHANCING VEHICULAR COMMUNICATIONS AT MULTIPLE FREQUENCY BANDS

The present disclosure relates generally to cutting-edge antenna systems for various vehicles, including rockets, missiles, and aircraft, and more particularly to antenna systems for various vehicles that are crucial for reliable and efficient communications with a ground site in demanding environments.

BACKGROUND

Modern vehicular communication systems, particularly those using spectrally efficient modulation schemes, demand significantly stricter phase variation specifications compared to past designs. These stricter requirements translate to more accurate vehicle location during its trajectory by using better antenna design that transmits and receives microwave signals to/from ground sites.

Modern flight testing of missiles and rockets requires seamless communication for both mission-critical telemetry data transmission and accurate GPS-based tracking and navigation. However, several factors create significant challenges increasing data demands, spectrum scarcity, and spectrally efficient modulation.

Advanced missiles and rockets generate more telemetry data, necessitating wider radio frequency (RF) bandwidths for transmission. The available RF spectrum for telemetry is limited and shared by multiple users, requiring efficient utilization. Regulators often mandate spectrally efficient modulation schemes like Shaped-Offset Quaternary Phase Shift Keying (SOQPSK) to optimize spectrum usage. While reducing bandwidth requirements, these schemes are more sensitive to phase values.

Further, challenge impact of phase sensitivity such as telemetry data degradation, and GPS signal loss. If the received signal's phase varies significantly over time (due to vehicle rolling or antenna pattern nulls), it can introduce errors and degrade telemetry data quality. GPS uses the less robust Bi-Phase Shift Keying (BPSK) modulation, making it even more susceptible to phase changes. Large phase values can lower the carrier-to-noise ratio (C/No) and cause the GPS receiver to lose signal lock.

Traditional 2-Element Patch Antenna Arrays may consist of two microstrip patch elements of similar dimensions as that of single U-shaped antenna with corporate feeding technique and have quarter wave transformers for impedance matching. The input impedance of the feeding network is of 50Ω and SMA connector of same impedance is used. However, these antennas often have "null regions" in their radiation pattern, meaning they transmit poorly in certain directions due to large phase variations in the azimuthal plane. When the phase values in these null regions are steep, they create even more significant challenges for both telemetry and GPS communication resulting loss of communication with ground in the worst-case scenario or creating large uncertainty in the trajectory of the vehicle.

Therefore, there is a need for cutting-edge antenna systems for various vehicles, including rockets, missiles, and aircraft. These systems are crucial for reliable and efficient communication in demanding environments.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to cutting-edge antenna systems for various vehicles, including rockets, missiles, and aircraft. These systems are crucial for reliable and efficient communication in demanding environments.

An embodiment of the first aspect wherein a contiguous radiating annular ring antenna is designed for enhancing vehicular communications. The antenna structure comprises a plurality of sectors having a curved shape structure that is configured to affix around a body of a vehicle using one or more fasteners, thereby forming the contiguous radiating annular ring antenna. The antenna structure has a phase variation of less than 2° degrees over 360° of azimuth coverage and about +/−85° of elevation coverage. The antenna structure is compact and has a thickness of less than 0.5 inches. In one embodiment, each sector comprises a plurality of antenna elements, a plurality of phase shifters, one or more combiners, and a plurality of frequency barriers.

In one embodiment, the antenna elements are configured to generate output signals at different operating frequency bands corresponding to received RF signals. The phase shifters are configured to connect to the antenna elements for providing stringent phase values in the output signals. Each phase shifter is adapted to steer the direction of the output signals at different operating frequency bands or to adjust the frequency response of the output signals. Each operating band has a set of phase shifters working at the same frequency band, and each band gets its own set.

The combiners are adapted to connect to each respective subset of phase shifters through cables. The combiners are configured to combine the output signals received from the each respective subset of phase shifters to output respective combined output signals.

The frequency barriers are disposed between each radiating ring to minimize interference between the operating frequency bands to increase isolation among various frequency bands. The frequency barriers in the form of radio frequency (RF) fences are disposed between each radiating ring to minimize interference between the operating frequency bands.

In one embodiment, each sector comprises a beam forming network that is configured to be incorporated into a printed antenna board for enhancing the vehicular communications. The antenna elements are disposed on the printed antenna board in a horizontal configuration. The antenna elements are antenna strips. The antenna elements include a first antenna strip, a second antenna strip, and a third antenna strip. The antenna elements are disposed on the printed antenna board of the respective sector forms radiating rings upon forming the contiguous radiating annular ring antenna. The printed antenna board is attached to a panel, which is made of a durable material comprises at least one of aluminum, flame retardant 4, woven glass reinforced hydrocarbon, ceramics, polyimide (PI), liquid crystal polymer, carbon fiber composite and any metallized composites.

In one embodiment, the contiguous radiating annular ring antenna comprises a plurality of frequency barriers that is disposed between each radiating ring to minimize interference between the operating frequency bands. The frequency barriers comprise at least two frequency barriers for minimizing interference between the operating frequency bands. Each sector comprises at least one printed antenna board with the antenna elements in the horizontal configuration. The sectors comprise at least six sectors, which are configured to be affixed together using the one or more fasteners. The sectors comprise one or more openings for receiving the fasteners.

Another embodiment of the first aspect wherein a ring antenna structure for a vehicle. The ring antenna structure comprises a circular ring that is mounted around the vehicle body, wherein the circular ring comprises a plurality of sector. The ring antenna structure comprises a plurality of slots that are disposed within each sector, wherein each slot is offset for in a phase excitation. The ring antenna structure comprises a combiner configured to connect each slot with a low-loss cable. In one embodiment, the sector comprises at least six sectors. Each sector comprises at least five slots per subarray element for efficient in-phase excitation.

Another embodiment of the first aspect wherein a method of radiating a plurality of frequency bands from a vehicle. The method comprise, providing the contiguous radiating annular ring antenna structure mounted on the vehicle body. The method comprise, connecting the sectors of each radiating ring to form a closed loop. The method comprise, combining outputs of the first, second, and third radiating rings. The method further comprise, radiating the first frequency band from the first radiating ring, the second frequency band from the second radiating ring, and the third frequency band from the third radiating ring.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Reference will now be made in detail to the present preferred embodiments of the invention, examples of which are illustrated in the accompanying drawings. Wherever possible, the same reference numerals are used in the drawings and the description to refer to the same or like parts.

Figure 1A:
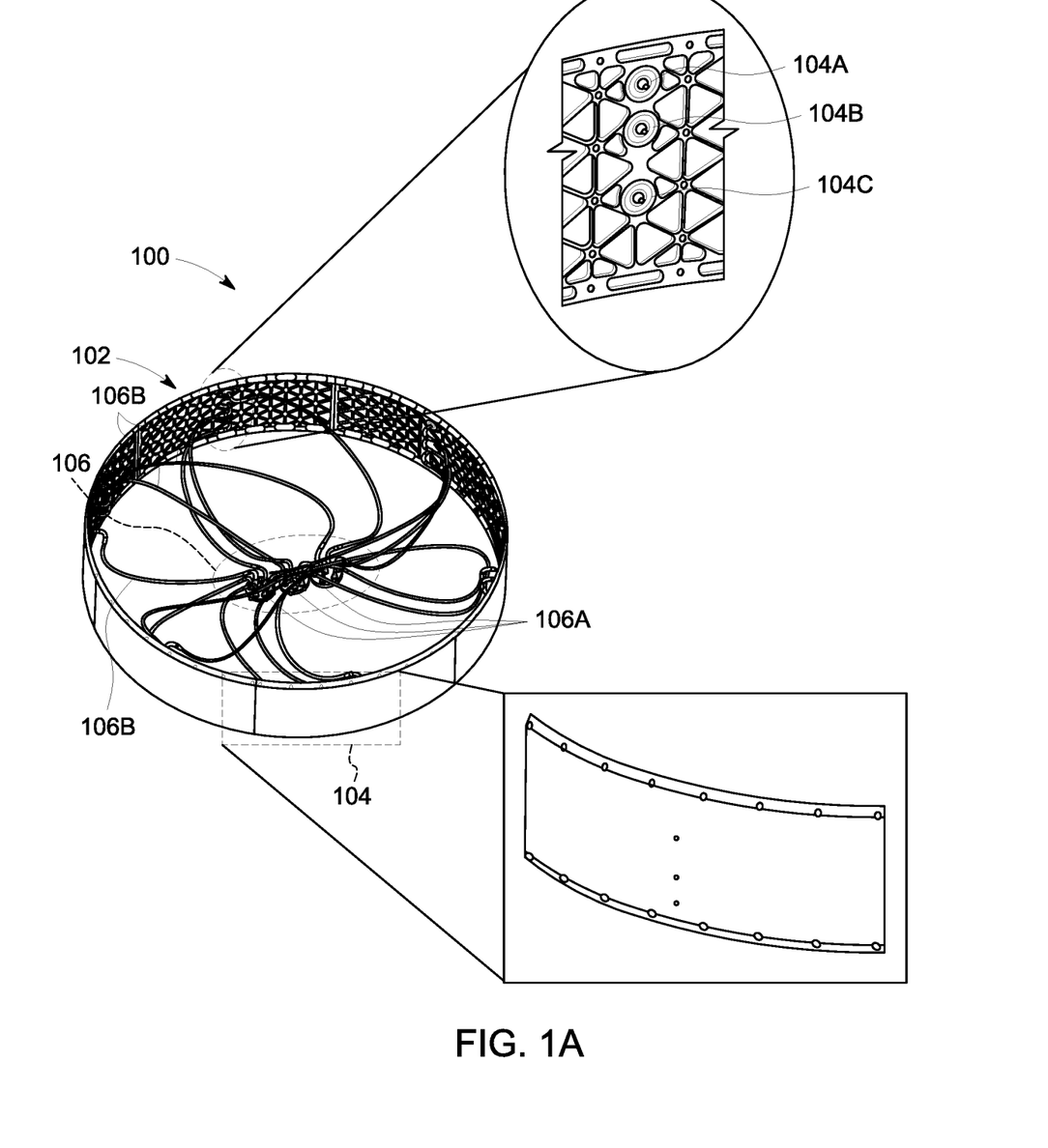
FIG. 1A illustrates a perspective view of a contiguous radiating annular ring antenna structure for a vehicle, in accordance with embodiments of the invention.

FIG. 1A depicts a perspective view of a contiguous radiating annular ring antenna structure 100 for a vehicle. The contiguous radiating annular ring antenna structure 100 comprises a plurality of sectors 104 having a curved shape structure 102 that is configured to affix around a body 12 of a vehicle using one or more fasteners 110, thereby forming the contiguous radiating annular ring antenna structure 100. In another embodiment, the body 12 is a cylindrical hollow body, which will be bolted on the vehicle. In one embodiment, the vehicle includes, but not limited to, an aircraft, a missile, a torpedo, a car, and a space craft, thereof.

In one embodiment, each sector 104 comprises a plurality of antenna elements, a plurality of phase shifters, one or more combiners 106A, and a plurality of frequency barriers 108. The antenna structure 100 has a phase variation of less than 2° degrees over 360° of azimuth coverage and about 85° of elevation coverage. The antenna structure 100 has a thickness of less than 0.5 inches.

The antenna elements are configured to generate output signals at different operating frequency bands corresponding to received RF signals. The antenna elements are disposed on the printed antenna board in a horizontal configuration. The antenna elements could be antenna strips. The antenna elements disposed on the printed antenna board of the respective sector forms radiating rings upon forming the contiguous radiating ring antenna structure 100. The antenna elements include a first antenna strip 102A, a second antenna strip 102B, and a third antenna strip 102C. Each radiating ring comprises at least six sectors 104. Each sector 104 comprises a plurality of coax connectors (104A, 104B, and 104C). In one embodiment, the antenna strip (102A, 102B, and 102C) are a first radiating ring, a second radiating ring, and a third radiating ring, respectively.

The antenna elements i.e., the first antenna strip 102A, the second antenna strip 102B, and the third antenna strip 102C are disposed on the printed antenna board of the respective sector forms radiating rings (102A, 102B, 102C) upon forming the contiguous radiating annular ring antenna structure 100. The printed antenna board is attached to a panel, which is made of a durable material comprises, but not limited to, aluminum, flame retardant 4, woven glass reinforced hydrocarbon, ceramics, polyimide (PI), liquid crystal polymer, carbon fiber composite and any metallized composites. Each sector of comprises at least one printed antenna board with the antenna elements in the horizontal configuration.

The phase shifters are configured to connect to the antenna elements for providing stringent phase values in the output signals, wherein each phase shifter has different frequency bands. The plurality of phase shifters is adapted to steer the direction of the output signals at different operating frequency bands or to adjust the frequency response of the output signals. Each phase shifter operates within a designated frequency band, ensuring optimal control within that specific range. Each frequency band utilizes its own set of phase shifters specifically designed for that band's characteristics. In another embodiment, the phase shifters are coaxial line lengths.

In one embodiment herein, a connecting unit 106 is configured for connecting the sectors 104 of each radiating ring (102A, 102B, 102C). The connecting unit 106 comprises at least one of a cable 106B and a combiner 106A. The connecting unit 106 comprises a multi-port power combiner 106A to combine RF signals from different sectors 104 and forming a contiguous annular ring radiating aperture or antenna structure 100. The frequency barriers 108 in the form of radio frequency (RF) fences comprise at least two frequency barriers for minimizing interference between the operating frequency bands. The frequency barriers 108 are positioned in-between or on the curved shape structure 102. The operating frequency bands comprise at least three operating frequency bands. The operating frequency bands comprise a first operating frequency band operates at L2 band, a second operating frequency band operates at L1 band, and a third operating frequency band operates at S band. In one exemplary embodiment herein, the L2 band ranges from, but not limited to, 1200 MHz to 1250 MHz, the L1 band ranges from, but not limited to, 1,560 MHz to 1,590 MHz, and the S band rages from 2200 MHz to 2390 MHz.

In one embodiment, the combiners 106A are adapted to connect to each respective subset of phase shifters through cables 106B. The combiners 106A are configured to combine the output signals received from each respective subset of phase shifters to output respective combined output signals. The frequency barriers 108 are disposed between each radiating ring (102A, 102B, 102C) to minimize interference between the operating frequency bands to increase isolation among various frequency bands.

In one embodiment, the antenna structure 100 comprises a back panel and a radiating aperture. The back panel is situated inside the antenna structure 100 and plays a crucial role in providing mechanical stability and structural support. The radiating aperture is a functional component of the antenna structure 100. The radiating aperture is configured for emitting and receiving electromagnetic signals. In other words, it is the part of the antenna structure 100 that is responsible for transmitting and receiving signals to and from other devices. Together, these two components form a complete antenna structure that is capable of providing reliable wireless communication in a variety of applications and environments.

The sectors 104 comprises at least six sectors, which are configured to be affixed together using the one or more fasteners 110. The sectors 104 comprises one or more openings for receiving the fasteners 110.

In one embodiment, the back panel of the antenna structure 100 is made up of a durable material that is designed to be light weight and withstand various types of wear and tear. The durable material comprises at least one of aluminum, flame retardant 4, woven glass reinforced hydrocarbon, ceramics, polyimide (PI), liquid crystal polymer, carbon fiber composite and any metallized composites. The back panel is securely bonded to the curved shape structure 102, which ensures that the different components of the device remain attached and function properly. Additionally, each coax connector (104A, 104B, and 104C) is integrated into a bracket, which is further bonded onto the back panel. The back panel consists of a complex multilayer makeup of mixed copper, dielectric, and bonding film. This unique combination of materials provides a sturdy and reliable base for the various components of the device. The Printed Antenna Board (PAB) is also integrated into the back panel, along with the BFN. This allows for efficient and effective wireless communication capabilities. The antenna structure 100 is mounted to the outside diameter of the vehicle body, and the External Protection Material (EPM) is bonded onto the PAB as a part of it. This ensures that the antenna structure 100 remains securely attached to the vehicle body and operates smoothly.

Figure 1B:
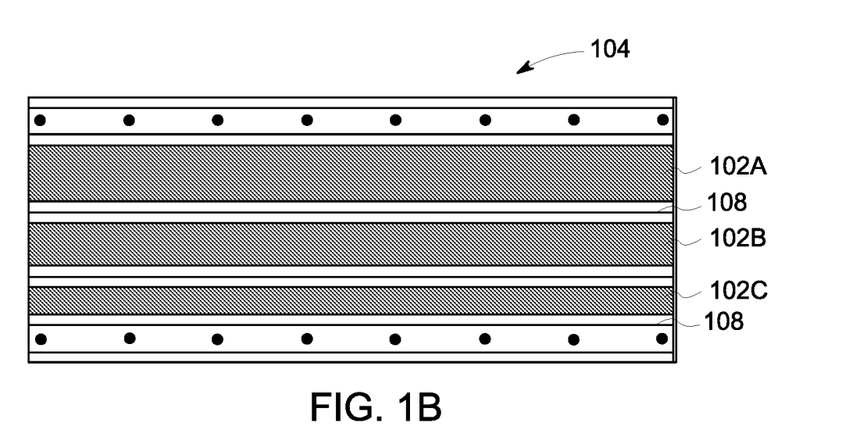
FIG. 1B illustrates a sectional top view of the antenna structure, in accordance with embodiments of the invention.
Figure 1C:
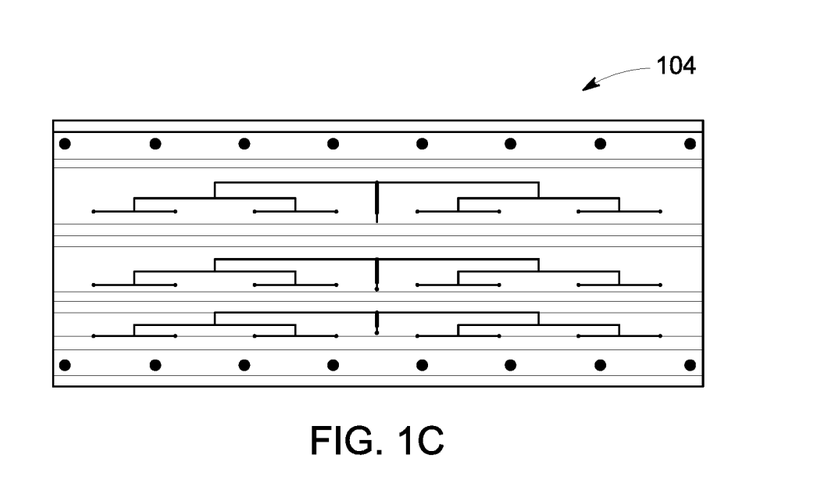
FIG. 1C illustrates a sectional view of the antenna structure, in accordance with embodiments of the invention.

FIGS. 1B-1C refer to sectional views of the antenna structure 100. Each sector 104 of the antenna structure 100 consists of the first radiating ring 102A, the second radiating ring 102B, and the third radiating ring 102C as three strip antennas (represented as L2, L1, and S). A beam forming network incorporated into the curved shape structure 102 under the aperture. In specific, each sector 104 comprises the beam forming network that is configured to be incorporated into a printed antenna board for enhancing the vehicular communications.

The antenna strips or the three rings (102A, 102B, and 102C) are strategically positioned to enable the reception and transmission of signals within specific directions, thereby enhancing the overall performance of the antenna structure 100. In specific, the curved shape structure 102 is equipped with the beam forming network (BFN), which is situated beneath the aperture. The BFN facilitates the processing of signals in an efficient manner, thereby enabling the antenna structure 100 to optimize signal delivery. Specifically, the BFN assists to shape the beam pattern and optimize signals, resulting in clearer and more reliable communication.

Figure 1D:
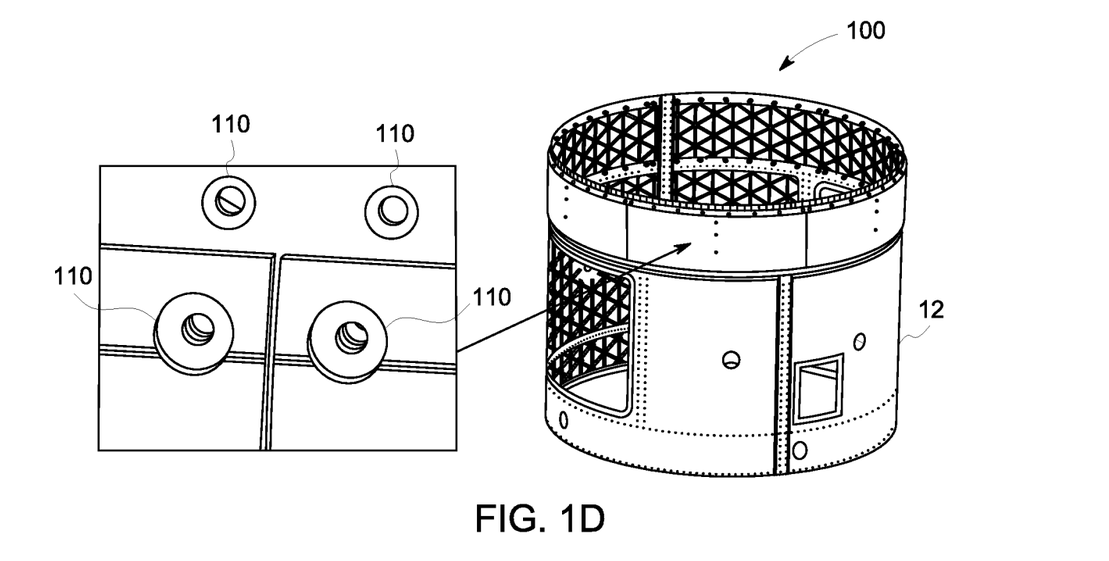
FIG. 1D illustrates a perspective view of the antenna structure is mounted on a vehicle cylinder, in accordance with embodiments of the invention.

FIG. 1D refers to a perspective view of the antenna structure 100 mounted on the body 12 of the vehicle. Each sector 104 is placed on the body 12 of the vehicle. The antenna structure 100 is connected to the body 12 of the vehicle through a plurality of fasteners 110. The fasteners 110 comprise, but not limited to, bolts and nuts.

In another embodiment, the fasteners 110 is an adhesive material. The adhesive material is used to attach the antenna structure 100 on the body 12 of the vehicle. In another embodiment, the antenna structure 100 is integrated on the body 12 through welding.

The radiating aperture is a functional component of the antenna structure 100. The radiating aperture is configured for emitting and receiving electromagnetic signals. The antenna structure 100 can be removed by disconnecting coax cables on the inside and removing fastener on the outside. The antenna structure 100 is accessible for inspection and maintenance.

Figure 2A:
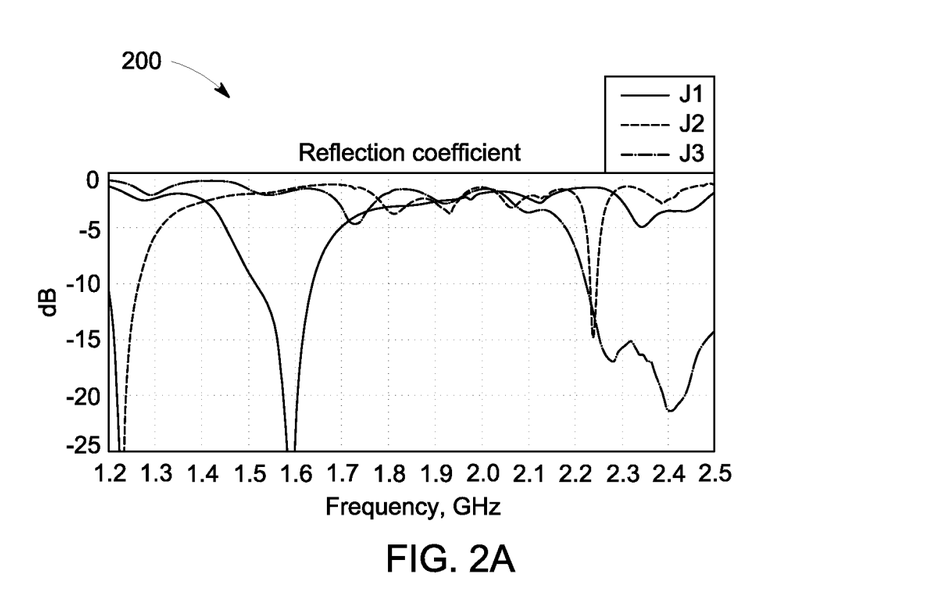
FIG. 2A depicts a reflection coefficient plot of the antenna structure, in accordance with embodiments of the invention.
Figure 2B:
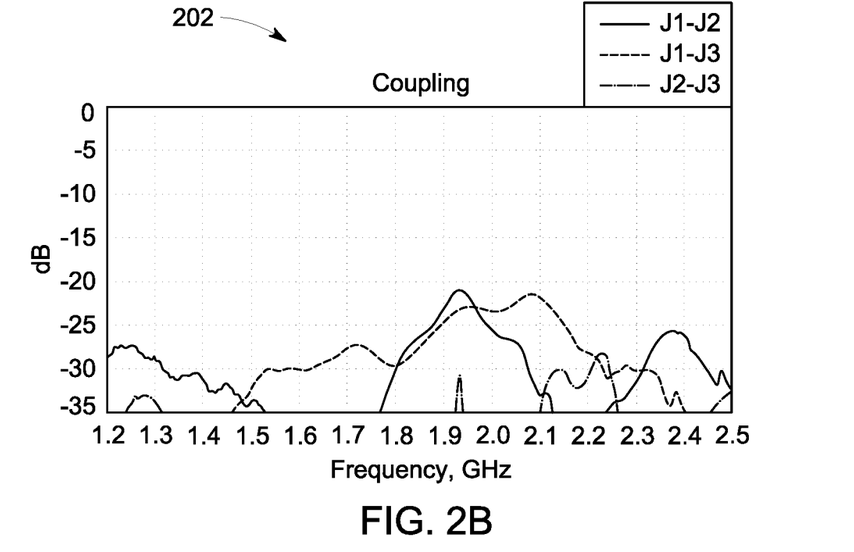
FIG. 2B depicts a coupling plot of the antenna structure, in accordance with embodiments of the invention.

FIG. 2A depicts a reflection coefficient plot 200 of the antenna structure 100. FIG. 2B depicts a coupling plot 202 of the antenna structure 100.

Figure 3A:
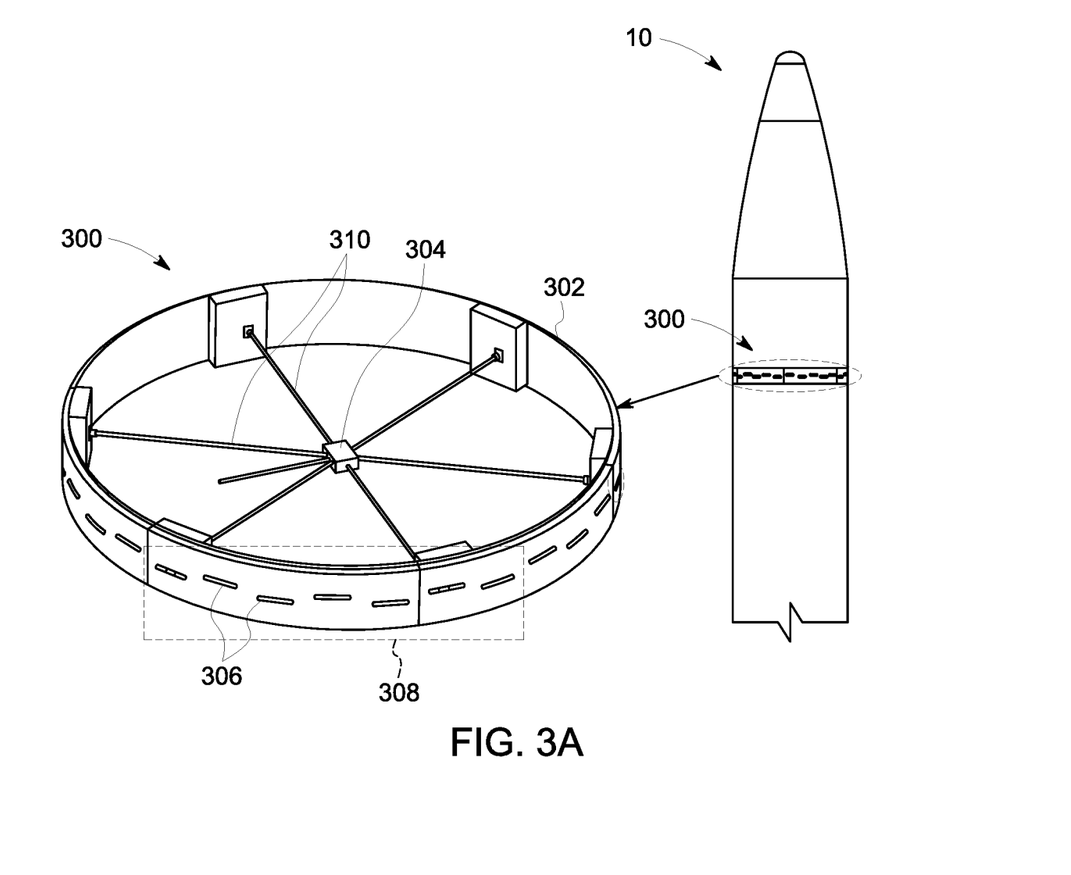
FIG. 3A illustrates a perspective view of a sector antenna mounted on a vehicle, in accordance with embodiments of the invention.
Figure 3B:
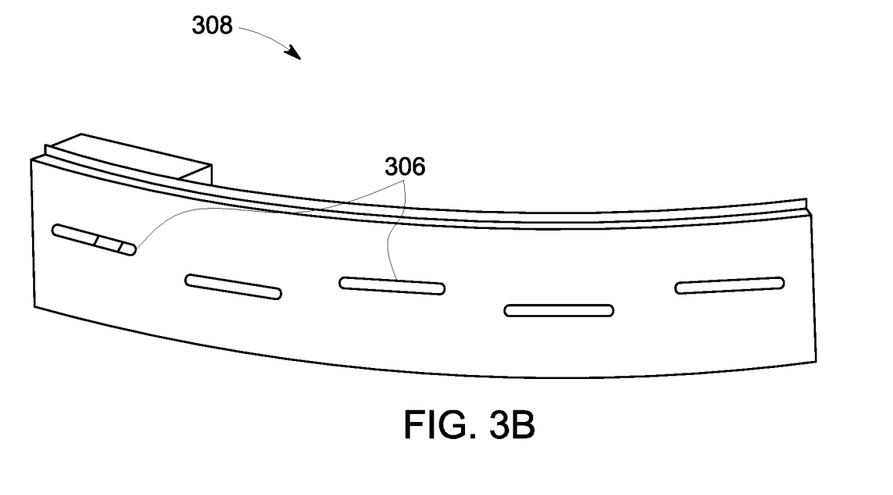
FIG. 3B illustrates a perspective view of a sector of the sector antenna, in accordance with embodiments of the invention.
Figure 3C:
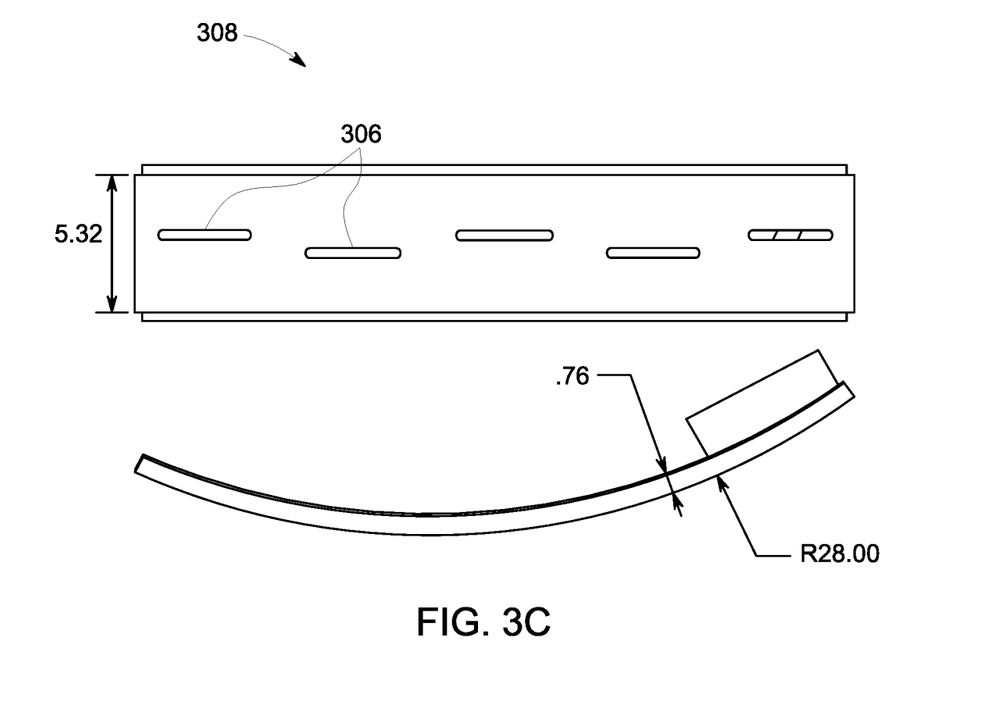
FIG. 3C illustrates a front view of the sector of the sector antenna, in accordance with embodiments of the invention.

FIGS. 3A-3C refer to a perspective view of a ring antenna structure 300 mounted on a vehicle 10. The ring antenna structure 300 comprises a circular ring 302, a plurality of slots 306 and a plurality of equal-sized sectors 308. Each sector 308 is fitted over the circumference of the vehicle. Each sector 308 comprises a plurality of antenna elements. The sectors 308 are likely arranged in the ring 302 around the vehicle. The ring antenna structure 300 is circular antenna array design for vehicles. In specific, the sectors 308 comprises at least six sectors.

Each sector 308 uses a traveling wave waveguide structure to guide and transmit radio waves. This eliminates the need for separate dielectric materials and beam forming networks, which can introduce losses and complexity. Further, each sector 308 comprises a plurality of slots 306, wherein the slots 306 comprises at least five slots for each 308.

In one embodiment, the ring antenna structure 300 utilizes a fully metallic design with five slots 306 per subarray element for efficient in-phase excitation. A thin load is housed inside, and a folded waveguide enables end-launching from a reduced-height waveguide. This design boasts several advantages such as no sector beamforming network (BFN) required, simplified electromagnetic shielding (ESD) mitigation, high thermal stability, and tolerance insensitivity.

By using a traveling wave structure, the ring antenna structure 300 design achieves lower losses and is simpler to implement compared to traditional antenna arrays. The ring antenna structure 300 provides a 10-fold improvement in phase variation performance compared to a 2-patch antenna array. The ring antenna structure 300 provide better signal focusing and potentially stronger signal transmission or reception.

In one embodiment, the ring antenna structure 300 comprises a connecting unit that is configured for connecting the sectors 308. The connecting unit comprises at least one of a plurality of cable 310 and a combiner 304. The sectors 308 are combined using either a low-loss N:1 combiner or a 1:N divider. This allows the signals from all sectors to be combined into a single output or divided for individual processing, wherein N is number of the sectors 308.

In one embodiment, each sector 308 employs a traveling wave waveguide structure, eliminating the need for dielectrics and beam forming networks, resulting in simpler design, lower losses, and improved gain. The sectors 308 are combined using low-loss cables 310 and an N:1 combiner or 1:N divider, offering flexibility in signal processing. In one embodiment, the ring antenna structure 300 has a thickness of less than 0.8 inches and width ranging from 5 to 6 inches.

Figure 4A:
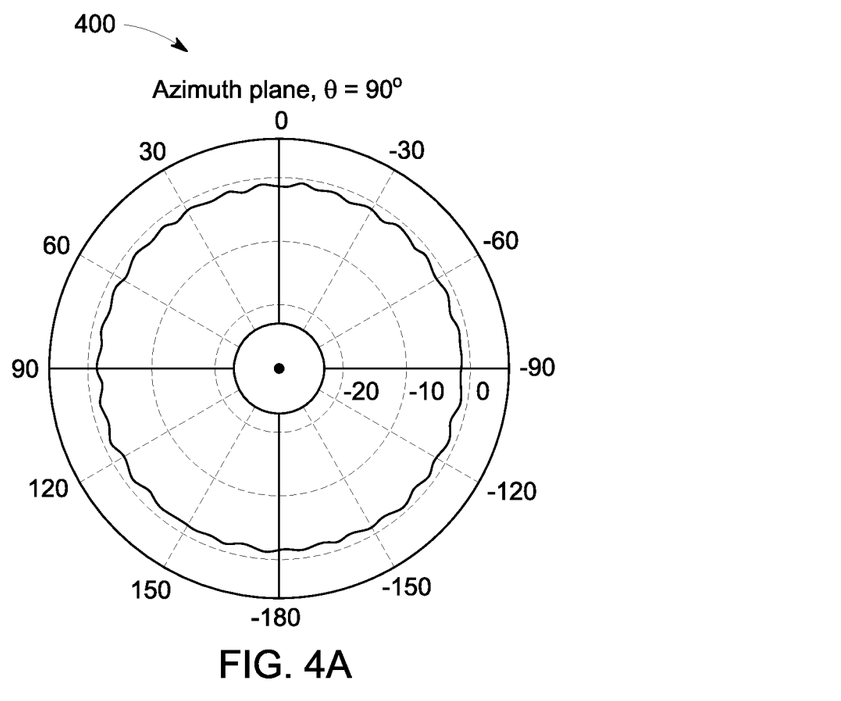
FIG. 4A illustrates computed pattern of an azimuth plot for the sector antenna, in accordance with embodiments of the invention.
Figure 4B:
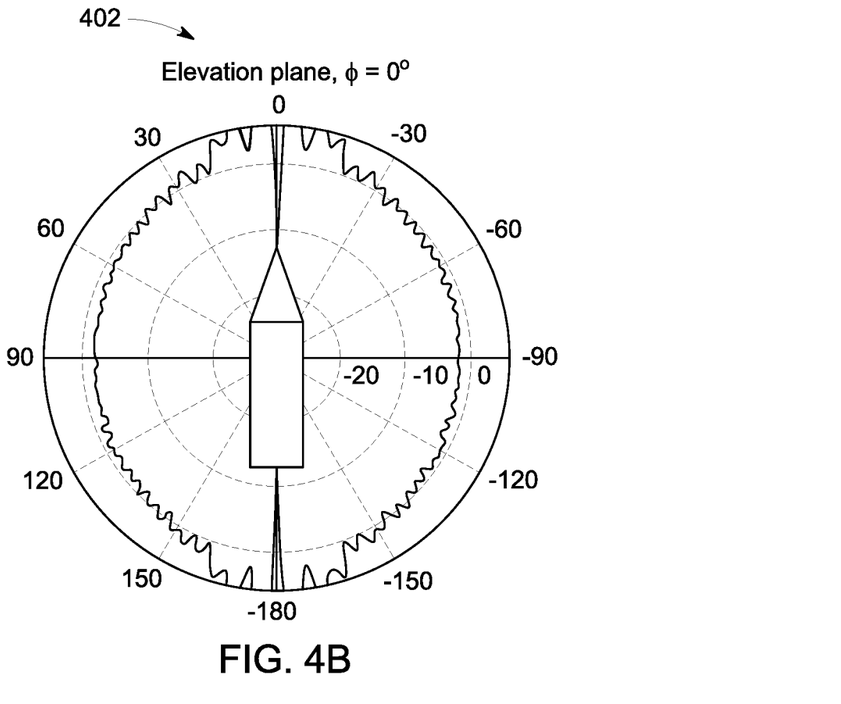
FIG. 4B illustrates computed pattern of elevation plot for the sector antenna, in accordance with embodiments of the invention.

FIGS. 4A-4B refer to computed pattern of an azimuth plot 400, and an elevation plot 402 for the ring antenna structure 300. The two-element array antenna structure 100 exhibits a maximum phase variation of 23 degrees, while the ring antenna structure 300 achieves a significantly tighter spread of 1.9 degrees. Phase incoherence in the two-element array antenna structure 100 is limited to 23 degrees, showcasing superior performance in the ring antenna structure 300 with a worst-case variation of only 1.9 degrees.

Figure 5:
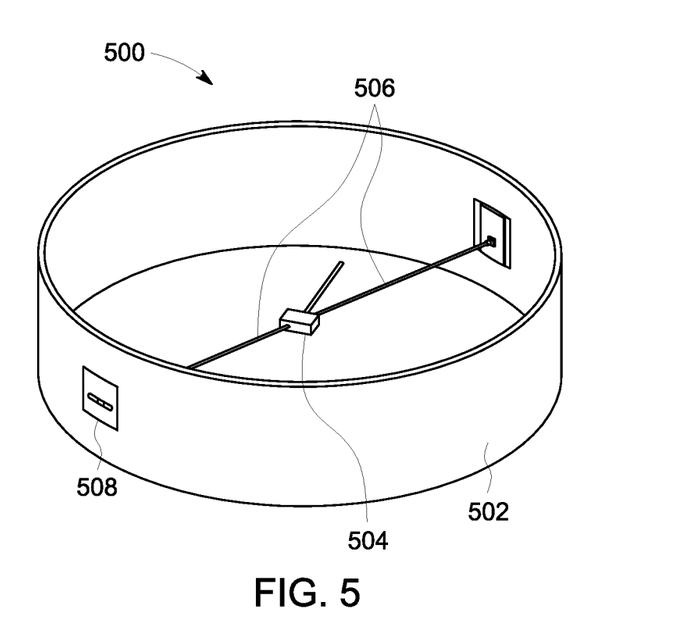
FIG. 5 illustrates a perspective view of a two-element array antenna, in accordance with embodiments of the invention.

FIG. 5 refers to a perspective view of a two-element array antenna 500. The two-element array antenna 500 comprises a connecting unit that is configured for connecting at least two orthogonally polarized slots 508. The connecting unit comprises at least one of a plurality of cable 506 and a combiner 504. These slots 508 are strategically positioned at diametrically opposing locations on the vehicle, which is 0° and 180°, to maximize spatial diversity. The orthogonal polarization (e.g., vertical and horizontal) minimizes phase variation by nulling mutual coupling at the critical 900 and 270° angles. This is achieved by suppressing the constructive interference that would otherwise occur due to the overlapping radiation patterns of the slots. Additionally, the combiner 504 is configured to coherently combine the received signals, further reducing phase incoherence and improving overall antenna performance.

Figure 6:
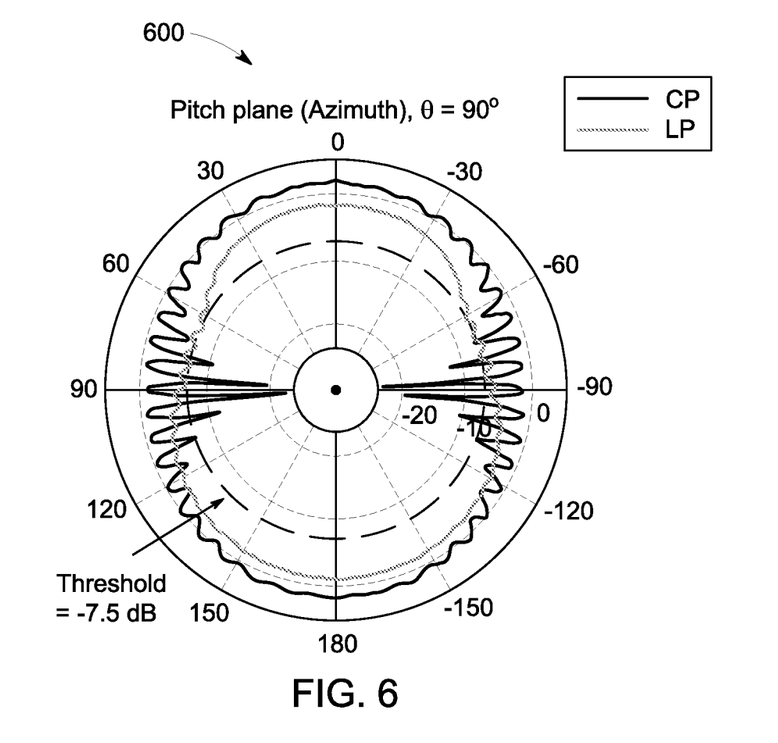
FIG. 6 illustrates a pitch plane plot of the two-element array antenna, in accordance with embodiments of the invention.

FIG. 6 refers to a pitch plane plot 600 of the two-element array antenna 500. The pitch plane plot 600 depicts a comparison between a convention two-element patch antenna array (CP), and the two-element array antenna 500 (LP). The pitch plane, also known as the H-plane or azimuth plane, refers to a plane perpendicular to the array's boresight direction and containing the antenna elements.

Figure 7A:
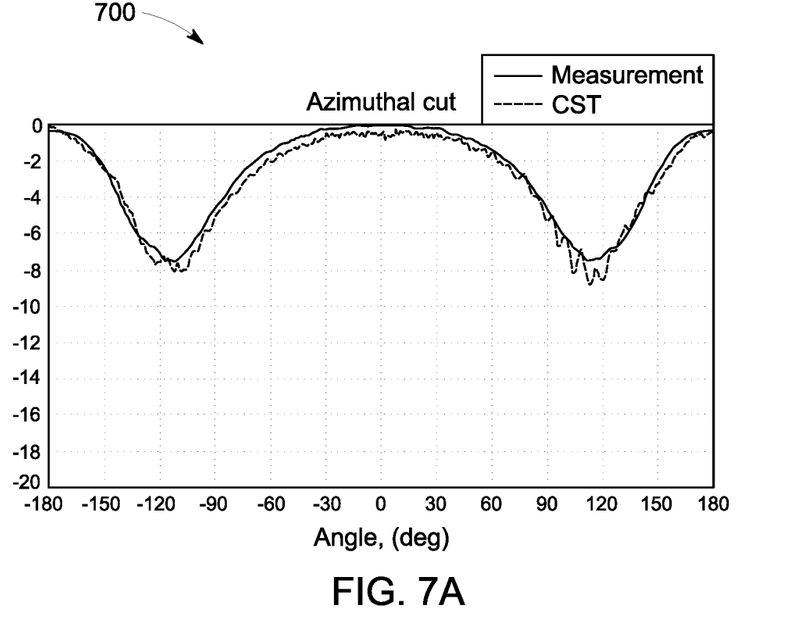
FIG. 7A illustrates an azimuth cut plot depicting simulated and measured amplitude patterns, in accordance with embodiments of the invention.
Figure 7B:
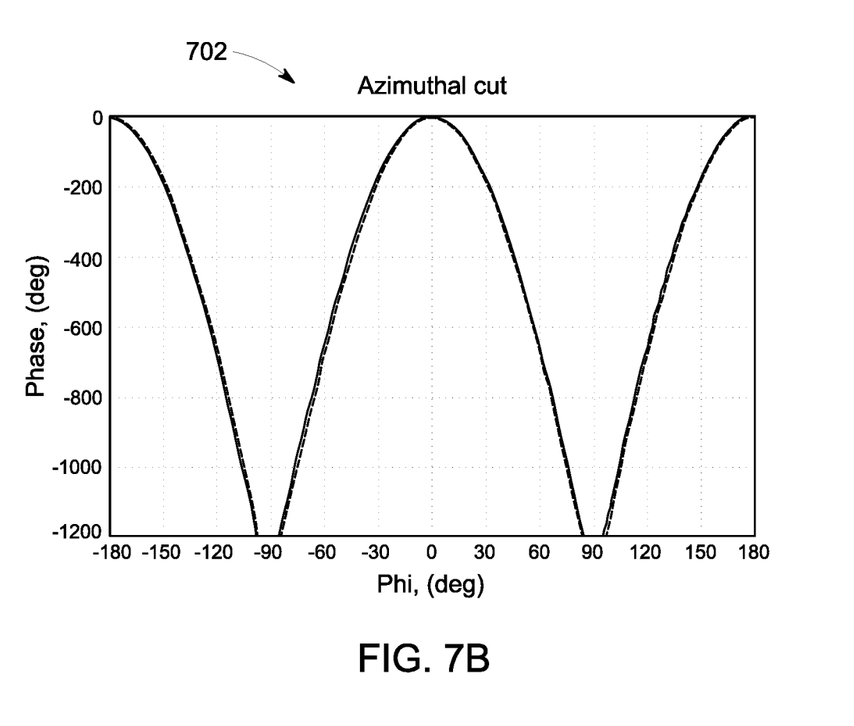
FIG. 7B illustrates an azimuth cut plot depicting the simulated and measured phase patterns, in accordance with embodiments of the invention.

FIGS. 7A-7B refer azimuth cut plots comparing simulated and measured performance of the two-element array antenna 500. FIG. 7A refers to an azimuth cut plot 700 depicting the simulated and measured amplitude patterns, highlighting any discrepancies between expected and actual signal strength across different horizontal angles. FIG. 7B refers to an azimuth cut plot 702 depicting the simulated and measured phase patterns, visualizing variations in wave propagation timing due to physical factors compared to theoretical predictions.

In one embodiment, table 1 depicts performance comparison of the two disclosed antenna designs.

TABLE 1

| Parameter | Required | Two-element array antenna 500 | Ring antenna structure 300 |
| --- | --- | --- | --- |
| Gain | −7.5 dB/85% over 4π | 86.8% | 100% |
| Variation (dB) in Azimuth Plane | 2 dB/deg, 85%, θ = 25° to 155° | 92.8% | 100% |
| Variation (deg) in Azimuth Plane | 20°/deg, 85%, θ = 25° to 155° | 84% | 100% |
| Variation (dB) in Elevation Plane | 2 dB/deg, 85%, θ = 25° to 155° | 98.4% | 100% |
| Variation (deg) in Elevation Plane | 20°/deg, 85%, θ = 25° to 155° | 96.1% | 95% |

Figure 8:
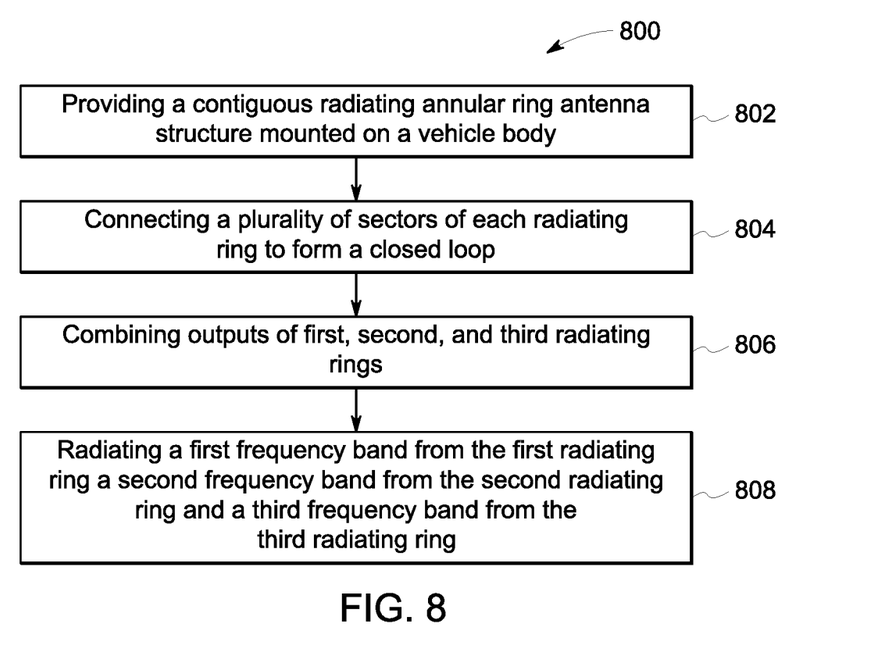
FIG. 8 depicts a flowchart for a method of radiating a plurality of frequency bands from a vehicle body, in accordance with embodiments of the invention.

FIG. 8 depicts a flowchart 800 for a method of radiating a plurality of frequency bands from the body 12 of the vehicle. The method comprise, providing the contiguous radiating annular ring antenna structure 100 mounted on the body 12 of the vehicle, as depicted at step 802. The method comprises, connecting the sectors 104 of each radiating ring to form a closed loop, as depicted at step 804. The method comprise, combining outputs of the first, second, and third radiating rings (102A, 102B, 102C), as depicted at step 806. The method further comprises, radiating the first frequency band from the first radiating ring 102A, the second frequency band from the second radiating ring 102B, and the third frequency band from the third radiating ring 102C, as depicted at step 808.

In another embodiment, the antenna structure 100 antenna emits radio waves in all directions. By introducing a phase shift to the signal fed to each antenna element, the radio waves from different elements can be made to interfere constructively in a particular direction and destructively in other directions. This creates a focused beam of radio waves that can be pointed in a specific direction. The phase shifters include ferrite phase shifters, pin diode phase shifters, and digital phase shifters based on the requirements.

The two-element array antenna 500, the ring antenna structure 300, and the antenna structure 100 are designs for demanding vehicular applications, including missiles, rockets, and aircraft. Each design offers significant advancements over traditional antenna solutions, addressing key challenges like phase variation and gain.

The two-element array antenna 500 are designed with strategically cross-polarized slots 108. This configuration delivers superior performance compared to existing options, offering benefits such as improved signal quality and stability, and reduced interference and noise susceptibility.

The ring antenna structure 300 utilizes a sector-based antenna featuring a large number of discretely spaced elements. Compared to the standard two-element array, the ring antenna structure 300 delivers significant performance improvements in phase variation reduction for more consistent signal transmission and reception. Overall gain enhancement for stronger and more reliable signals.

The antenna structure 100 is a contiguous radiating annular ring antenna that is constructed with six metal radiator sectors 104. This configuration surpasses other designs by achieving minimal phase variation for unparalleled signal stability and accuracy, and optimal radio frequency (RF) performance, ideal for demanding communication applications.

The two-element array antenna 500, the ring antenna structure 300, and the antenna structure 100 aimed at vehicular platforms such as rockets, aircraft, and unmanned aerial vehicles (UAVs). These antennas address crucial requirements in navigation and positioning by integrating reliable GPS capabilities. Additionally, their S-band compatibility opens doors for various aerospace and communication applications, expanding their potential beyond conventional uses.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A contiguous radiating annular ring antenna for enhancing vehicular communications, comprising:
   a plurality of sectors having a curved shape structure configured to affix around a body of a vehicle using one or more fasteners, thereby forming said contiguous radiating annular ring antenna;
   wherein each sector of said plurality of sectors comprises:
      a plurality of antenna elements configured to generate output signals at different operating frequency bands corresponding to received RF signals;
      a plurality of phase shifters configured to connect to said plurality of antenna elements for providing stringent phase values in the output signals, wherein each phase shifter of said plurality of phase shifters is adapted to steer the direction of the output signals at different operating frequency bands or to adjust the frequency response of the output signals;
      one or more combiners adapted to connect to each respective subset of phase shifters through cables, wherein said one or more combiners are configured to combine the output signals received from each respective subset of phase shifters to output respective combined output signals; and
      a plurality of frequency barriers disposed between each radiating ring to minimize interference between the operating frequency bands to increase isolation among various frequency bands.

2. The contiguous radiating annular ring antenna of claim 1, wherein said each sector of said plurality of sectors comprises:
   a beam forming network configured to be incorporated into a printed antenna board for enhancing the vehicular communications.

3. The contiguous radiating annular ring antenna of claim 1, wherein said plurality of antenna elements is disposed on said printed antenna board in a horizontal configuration, wherein said plurality of antenna elements is antenna strips.

4. The contiguous radiating annular ring antenna of claim 1, wherein said plurality of antenna elements includes a first antenna strip, a second antenna strip, and a third antenna strip.

5. The contiguous radiating annular ring antenna of claim 1, wherein said plurality of antenna elements disposed on said printed antenna board of the respective sector of the plurality of sectors forms a plurality of radiating rings upon forming said contiguous radiating ring antenna.

6. The contiguous radiating annular ring antenna of claim 5, wherein said printed antenna board is attached to a panel, which is made of a durable material comprises at least one of aluminum, flame retardant 4, woven glass reinforced hydrocarbon, ceramics, polyimide (PI), liquid crystal polymer, carbon fiber composite and other metallized composites.

7. The contiguous radiating annular ring antenna of claim 6, wherein the plurality of frequency barriers comprise at least two frequency barriers for minimizing interference between the operating frequency bands.

8. The contiguous radiating ring antenna of claim 1, wherein said contiguous radiating ring antenna comprises:
   a plurality of frequency barriers in the form of radio frequency (RF) fences disposed between each radiating ring to minimize interference between the operating frequency bands.

9. The contiguous radiating annular ring antenna of claim 1, wherein said each sector of the plurality of sectors comprises at least one printed antenna boardwith said plurality of antenna elements in the horizontal configuration.

10. The contiguous radiating annular ring antenna of claim 1, wherein said plurality of sectors comprises at least six sectors, which are configured to be affixed together using the one or more fasteners.

11. The contiguous radiating annular ring antenna of claim 1, wherein said plurality of sectors comprises one or more openings for receiving the fasteners.

12. A ring antenna structure for a vehicle, comprising:
   a circular ring mounted around a vehicle body, wherein the circular ring comprises a plurality of sectors;
   a plurality of slots disposed within each sector of said plurality of sectors, wherein each slot is offset for in a phase excitation;

a combiner configured to connect each slot with a low-loss cable; and a plurality of frequency barriers disposed between each radiating ring to minimize interference between the operating frequency bands to increase isolation among various frequency bands.

13. The ring antenna structure of claim 12, wherein the plurality of sector comprises at least six sectors.

14. The ring antenna structure of claim 12, wherein each sector of said plurality of sectors comprises at least five slots per subarray element for efficient in-phase excitation.

15. A method of radiating a plurality of frequency bands from a vehicle, comprising:

providing a contiguous radiating annular ring antenna structure mounted on a vehicle body, the antenna structure comprising a first radiating ring, a second radiating ring, and a third radiating ring, each radiating ring comprising a plurality of sectors;

connecting the plurality of sectors of each radiating ring to form a closed loop;

combining outputs of the first, second, and third radiating rings; and radiating a first frequency band from the first radiating ring, a second frequency band from the second radiating ring, and a third frequency band from the third radiating ring.

16. The method of claim 15, wherein the radiating a first frequency band from the first radiating ring, a second frequency band from the second radiating ring, and a third frequency band from the third radiating ring comprises radiating the first, second, and third frequency bands simultaneously.

17. The method of claim 15, further comprising minimizing interference between the first, second, and third frequency bands by positioning a plurality of RF fences between the rings.

18. The method of claim 15, wherein the antenna structure has a phase variation of less than 2° degrees over 360° of azimuth coverage and about +/−85° of elevation coverage.

19. The method of claim 15, wherein the antenna structure comprises a radiating aperture and a back panel bonded to a printed antenna board (PAB), wherein the back panel is made up of a durable material comprises at least one of aluminum, flame retardant 4, woven glass reinforced hydrocarbon, ceramics, polyimide (PI), liquid crystal polymer, carbon fiber composite and any metallized composites.

20. The method of claim 15, wherein the antenna structure has a thickness of less than 0.5 inches.

* * * * *